US008437509B1

(12) United States Patent
Hallenborg et al.

(10) Patent No.: US 8,437,509 B1
(45) Date of Patent: May 7, 2013

(54) SYSTEM AND METHOD FOR INFERRING VESSEL SPEED FROM OVERHEAD IMAGES

(75) Inventors: Eric Hallenborg, San Diego, CA (US); Heidi Buck, San Diego, CA (US); John Stephen deGrassie, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 54 days.

(21) Appl. No.: 13/298,037

(22) Filed: Nov. 16, 2011

(51) Int. Cl.
*G06K 9/00* (2006.01)
(52) U.S. Cl.
USPC ............................................ 382/107; 701/21
(58) Field of Classification Search .................. None
See application file for complete search history.

(56) References Cited

U.S. PATENT DOCUMENTS 8,140,257 B2 * 3/2012 Villaume et al. .............. 701/467
8,315,750 B2 * 11/2012 Blanke et al. ................... 701/21

FOREIGN PATENT DOCUMENTS

JP          2003-004846     * 1/2003

OTHER PUBLICATIONS

Osamu et al., Japanese Patent Publication 2003-004846 Translation obtained via Patent Abstracts of Japan (PAJ), Published Jan. 8, 2003, Accessed Mar. 5, 2013.*
Buck et al. "Ship detection and classification from overhead imagery ", Proc. SPIE 6696, Applications of Digital Image Processing XXX, 66961C (Sep. 24, 2007); doi:10.1117/12.754019.*

Wu et al. A Remote Sensing Technique for the Estimation of a Moving Ship's Velocity and Length From Its Wave Spectra, Oceans '91. Ocean Technologies and Opportunities in the Pacific for the 90's. Proceedings, Date of Conference: Oct. 1-3, 1991.*
T. H. Havelock, "The Propagation of Groups of Waves in Dispersive Media, with Application to Waves on Water Produced by a Travelling Disturbance", Proceeding of the Royal Society of London A, vol. 81, pp. 398-430 (1908).
F. Ursell, "On Kelvin's Ship-Wave Pattern", Journal of Fluid Mechanics, vol. 8, pp. 418-431 (1960).
Zhijian Wu and Guy A. Meadows, "A Remote Sensing Technique for the Estimation of a Moving Ship's Velocity and Length From Its Wave Spectra", IEEE Oceans '91, vol. II, pp. 810-817 (1991).
Gregory Zilman et al., "The Speed and Beam of a Ship From Its Wake's SAR Images", IEEE Transaction on Geoscience and Remote Sensing, vol. 42, No. 10 (2004).

* cited by examiner

*Primary Examiner* — Bhavesh Mehta
*Assistant Examiner* — Tahmina Ansari
(74) *Attorney, Agent, or Firm* — Arthur K. Samora; Kyle Eppele (57) ABSTRACT

Systems and methods for determining the speed of a vessel from an overhead image of the vessel's wake can include the initial step of defining a cusp line for the wake. A representative line segment from the defined cusp line that is suitable for building an image intensity profile for the image can be selected. Once the intensity profile is built along the line segment, the wake wavelength $\lambda_{cusp}$ from the image intensity profile can be found by measuring the distance between successive points of intensity maxima (or successive intensity minima points) along the line segment. Once $\lambda_{cusp}$ is found, the vessel speed can be determined from the images according to the formula $v_{ship} = \sqrt{1.352 * \lambda_{cusp}}$. The systems and methods can be practiced using any overhead imagery systems that display a vessel's wake, including synthetic aperture radar (SAR) and electro-optical (EO) overhead imagery systems.

14 Claims, 7 Drawing Sheets

| Ship Name | AIS (kts) | Wake Enforcer (kts) | %Error |
|---|---|---|---|
| Balearia | 25.9 | 24.95 | 3.67% |
| Lineas European | 13.8 | 13.50 | 2.17% |
| Aegean Heavn | 23.6 | 22.50 | 4.66% |
| Capital Sun | 11.3 | 10.77 | 4.69% |
| Gertrud | 14.5 | 13.77 | 5.07% |
| Izumo Bay | 18.7 | 17.45 | 6.67% |
| Kenza | 10.8 | 10.59 | 1.94% |
| Lady Sadika | 12.1 | 12.30 | 1.61% |
| Mercury Ocean | 14.6 | 13.86 | 5.07% |
| Modi R | 5.6 | 7.81 | 39.46% |
| MSC Samanth | 15.3 | 14.87 | 2.84% |
| VB Artico | 13.5 | 11.05 | 18.15% |
| Average Error: | | | 8.00% |
| Average Error w/o outliers: | | | 3.84% |

Poor Wake Features

SYSTEM AND METHOD FOR INFERRING VESSEL SPEED FROM OVERHEAD IMAGES

FEDERALLY-SPONSORED RESEARCH AND DEVELOPMENT

This invention (Navy Case No. 100881) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-5118; email ssc_pac_T2@navy.mil.

FIELD OF THE INVENTION

This invention pertains generally to systems and methods for monitoring vessels using overhead imagery. More particularly, the invention pertains to systems and methods for monitoring vessels that allow the user to infer the speed of a vessel quickly and efficiently from a single overhead image.

BACKGROUND OF THE INVENTION

A growing need for maritime awareness has prompted significant research on technologies to allow for better monitoring of vessels. The systems range from automated transponders to Synthetic Aperture Radar (SAR) and Electro-Optical (EO) remote sensors, coupled with sophisticated processing algorithms. Part of the monitoring involves monitoring of the vessel speeds, and significant remote sensing research has been devoted to processing algorithms that can derive information from vessel wakes in SAR and EO images. In spite of the progress in these areas, key limitations remain. In particular, wake algorithms can only become useful once they are seamlessly integrated into a general image analysis system that allows a user to view, geo-reference, enhance and interpret the imagery at will. Mainly for this reason, a practical system has never been available that would allow a user to infer speed from wakes quickly and efficiently from a single remote collection.

It is currently possible to monitor vessel speeds in the vicinity of major ports and harbors using the Automatic Identification System (AIS). AIS transponders are required aboard all passenger-carrying ships and all international voyaging ships over 300 gross tons, primarily for collision avoidance. The transponders broadcast electronic messages once per minute to other ships and shore receivers, messages that include speed data from the navigation instruments. Clear drawbacks are that AIS transponders are not universally required, the transponders can possibly fail, and ship crews might decide to operate them in non-compliant ways.

Alternatively, high altitude remote sensing provides an independent means of speed measurement. SAR systems, e.g. RADARSAT-2, can be used to directly detect ships and measure their speeds via Doppler frequency shift measurements. However, researchers acknowledge several difficulties in determining ship speed from a single SAR collection pass, e.g. the need to identify fixed scattering objects, and the complicating effect of ship pitch and roll motions. In addition, target objects require relatively high Radar Cross Section (RCS) compared to the RCS variance of the surrounding natural sea surface. Small vessels can have negligible RCS, in particular those made from nonconductive materials such as wood or fiberglass. Finally, for both SAR and EO sensors, spatial resolution is a common limiting factor for direct monitoring.

An alternative way to infer a vessel's speed is by remotely observing the detailed structure of its wave wake, or its "Kelvin wake", a familiar phenomenon named for Lord Kelvin (William Thomson), who was credited with its first clear description in 1891. Both the Kelvin wake and the distinct "turbulent wake" commonly extend many kilometers away from the vessel, in both SAR and EO images. The classic Kelvin wake is a steady-state pattern of transverse and divergent surface gravity wave systems generated by the disturbance of the moving vessel. In sufficiently deep water, i.e. if the "Depth Froude Number" (DFN) is nearly zero, the pattern is bound by two rays, each approximately 19.5° from the ship's line of direction of motion. On these rays the two wave systems constructively interfere to form prominent "cusp waves", making the distinctive "V" shape. As early as 1881 Edmund Froude had already discovered a simple relationship between a ship's speed and the wavelength of its transverse wave. While today it is sometimes possible to apply this by measuring the transverse wave from high altitude imagery, the rapid decay of this wave usually makes it difficult. In contrast, the cusp waves decay more slowly, and the wavelength measured along the cusp line on either side of the "V" is also a simple function of vessel speed.

In view of the above, it is an object of the present invention to provide an overhead imagery system that allows a user to infer the speeds of vessels through the water, via the extraction of wake features in the images. Another object of the present invention is to provide an overhead imagery system and methods that determine a vessels speed through passive optical imagery taken from a sufficiently high altitude over the water surface. Still another object of the present invention is to provide an overhead imagery system and methods therefor that function as an unobtrusive "plug-in" module within the user's existing image viewing computer software system. Yet another object of the present invention is to provide an overhead imagery system and methods therefor that work even if only one passive optical image can be acquired, and even if the actual vessels are too small to be discerned in the image, i.e. only the vessel wake can be seen in the image. Still another object of the present invention is to provide an overhead imagery system and methods therefor that can be leveraged to improve maritime intelligence gathering and law enforcement. Another object of the present invention is to provide an overhead imagery system that extracts vessel speed information quickly, efficiently and accurately from remotely sensed imagery, to allow monitoring vessel speeds of many vessels and over large areas. These and other advantages of the invention, as well as additional inventive features, will be apparent from the description of the invention provided herein.

SUMMARY OF THE INVENTION

Systems and methods for determining the speed of a vessel from an overhead image of the wake of the vessel can include the initial step of defining a cusp line for the wake. Once the cusp line is defined, the methods can further include selecting a representative line segment from the cusp line, which is suitable for building an image intensity profile for the image along the selected line segment. The systems and methods can be practiced using any overhead image that displays a vessel's wake, including but not limited to, synthetic aperture radar (SAR) and electro-optical (EO) overhead imagery systems.

Once the intensity profile is built along the cusp line segment, the systems and methods according to several embodiments can include the further step of determining the wake cusp wavelength $\lambda_{cusp}$ from the image intensity profile. To do this, the distance between successive points of images intensity maxima along the line segment can be measured. Alternatively, the distance between successive points of intensity minima along the line segment can be measured. The measurement can be accomplished using either geo-rectified or geo-referenced images. Once $\lambda_{cusp}$ is found, the vessel speed can be determined from the images according to the formula $$v_{ship} = \sqrt{1.352 * \lambda_{cusp}}.$$

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION OF THE EMBODIMENTS

In brief overview, the invention according to several embodiments can employ easy-to-use interactive software which can interface with satellites or other means for generating overhead imagery such as reconnaissance aircraft to determine vessel speeds using the overhead imagery. In some embodiments, the invention can be implemented as a "plug-in" software module that operates within a remote sensing analyst's existing general-purpose image viewing system (IVS). In these embodiments, the user can leverage important IVS functions such as image geo-referencing and rectification, as well as a wide variety of IVS image equalization and enhancement functions that can often help reveal subtle but informative wake structures in an image. For these "plug-in" embodiments, the invention does not duplicate any existing IVS function; rather, it allows the user to work within the user's familiar IVS interface and on the user's existing satellite system.

Figure 1:
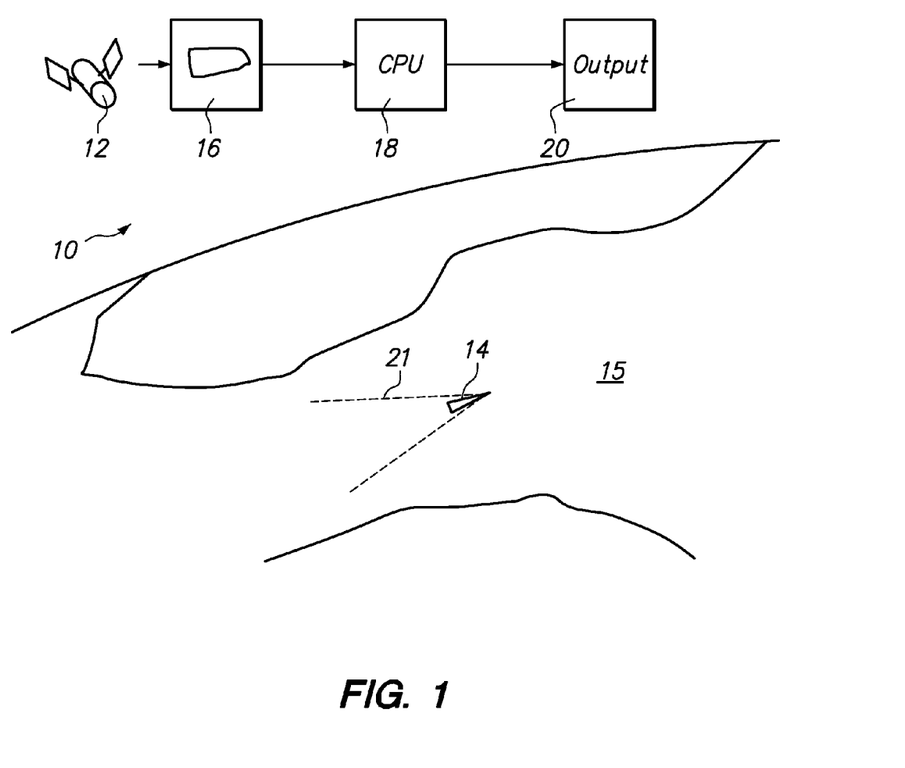
FIG. 1 is a simplified block diagram of a system for inferring vessel speed using overhead images in accordance with several embodiments of the present invention.

Referring initially to FIG. 1, a system for inferring vessel speeds using satellite imagery according to several embodiments of the present invention can be shown and can be generally designated by reference character 10. As shown, the system 10 can include a satellite 12, which detects ships/vessels 14 on the surface of earth 15 using imagery methods that are known in the art. One such imagery method can include nadir panchromatic electro-optical (EO) imagery. Another such method can be synthetic aperture radar (SAR) imagery. The satellite 12 generates an image 16 of vessel 14. The system and methods according to several embodiments of the present invention can manipulate image 16 using a processor 18 to yield a vessel speed output 20. The manner in which the system determines the vessel speed output 20 using the vessel wake 21 (see FIG. 1) is described more fully below.

In several embodiments, and as indicated in FIGS. 2-5, the invention can exploit a relationship between the speed of a displacement hull vessel and the wavelength of its Kelvin wave wake specifically along the wake cusp line 22, or the line along which the turbulent waves 30 caused by vessel motion through the water constructively interfere with the Kelvin (divergent) waves 32 caused by the vessel motion. A segment 24 or portion of the wake cusp line 22 can be chosen for analysis, and in several embodiments of the invention an image "intensity profile" can be built along the selected cusp line segment. The intensity profile can be defined as the image brightness as a function of distance, re-sampled along the user-selected line segment 24. Once the intensity profile for the line segment is built, the invention according to several embodiments can measure the dominant (cusp) wavelength of the profile, or the distance between successive pixel intensity maxima or pixel intensity minima in the intensity profile, and then compute the vessel speed using the dominant wavelength. The user may repeat the intensity profile extraction on multiple segments if improved accuracy is desired, via automatic averaging. Negligible computation time is required. In these embodiments, selection of the cusp line 22 can allow the user to select the relevant segments 24 from the wake cusp lines 22 while easily avoiding problematic areas, e.g. the turbulent wake or crossing wakes from other ships.

The invention according to several embodiments can assume a deep water regime, i.e. that the Froude Number is zero. The Froude number is known in the prior art as the ratio of a characteristic velocity to a gravitational wave velocity. It can also equivalently be defined in the prior art as the ratio of a body's inertia to gravitational forces. In fluid mechanics, the Froude number is used to determine the resistance of an object moving through water. A zero Froude number is valid assumption for typical surface vessels in open-ocean waters. The methods that assume a zero Froude Number can be effective for the above-cited EO and SAR images, and can also be effective for a broad range of high-altitude imaging geometries, and can work regardless of the radiometric units of the image. Furthermore, vessel 14 does not necessarily to be visible in image 16. All that is required is a suitable overhead image of wake 21.

In future constructions, new features could be added to improve the accuracy of results and to further reduce the chance of user-error, e.g. by adding visual guides to help the user select the cusp line and other wake structures. Further improvements could provide the user a wake suitability assessment. Also, in future constructions, additional analytical and computational models could be included to handle a wider range of situations, including the "shallow water" regime (i.e. nonzero Depth Froude Number) for both subcritical and supercritical speeds, and even multi-hulls (catamarans) and non-displacement hulls (hydrofoils). Such features could lead to other types of inferences (e.g. yielding the local water depth if the vessel speed is known).

Prior to initiating the methods of the present invention according to several embodiments, a geo-referenced or geo-rectified EO image 16 must be first provided by system 10. Once an image 16 is available, the user must locate the wake 21 of a moving vessel of interest. It is sufficient to locate only its wake, in cases when the vessel itself cannot be discerned. The image of the wake must also include "suitable wake features", which can be defined as a wake where a reasonable number of wake pixel maxima and minima are present along the selected segment 24 of wake cusp line 22. If suitable wake features are not clearly visible to the user, the image can be enhanced with contrast-stretching or equalization using the functionality of the IVS. If suitable wake features are at all present in the image, they can often become discernable after such enhancement (e.g. in EO images when some sections of the image are extremely bright, such as whitewater, the vessel itself, or small clouds).

Factors that can be used to determine if a wake image is "suitable" can include: 1) The ratio of the vessel's cusp wavelength to the satellite's altitude over the water is negligible (i.e., the altitude of the system above the vessel); 2) The ratio of one image pixel length to the vessel's cusp wavelength, i.e. the resolution of the image system 10 (The Nyquist criterion provides the absolute low-resolution limit of at least two pixels per cusp wavelength); 3) Whether the image system is pointed approximately straight down toward the wake being imaged so that the angle between the imager's boresight direction and the vector opposing zenith at the wake location is much smaller than 90 degrees; 4) The root-mean-squared tilt angle of the cusp wave is significant compared to that of the natural waves at the image location; 5) The root-mean-squared tilt angle of the natural waves is small compared to the sun's angle over the local horizon; and, 6) The sea state must not be great enough that there are significant "whitecaps". In significant wave-height conditions (i.e., if whitecaps are present due to sea state), cusp waves may be too difficult to discern.

The above conditions tend to be satisfied in typical satellite imaging systems that are imaging open seas that are reasonably calm. Such above conditions can also be satisfied on imaging systems that are mounted on aircraft.

Some examples of wake imaging conditions that can be unfavorable for use of the present invention according to several embodiments can include: 1) Aircraft imaging of a ship wake at a large slant angle and/or when the sun is very low; 2) Significant natural wave height and/or whitecaps that "drown out" the cusp wave brightness modulation; and, 3) The ship is moving too slow to generate cusp waves that are long enough to be sampled by multiple pixels (e.g., vessel speed is less than 5 knots).

Figure 2:
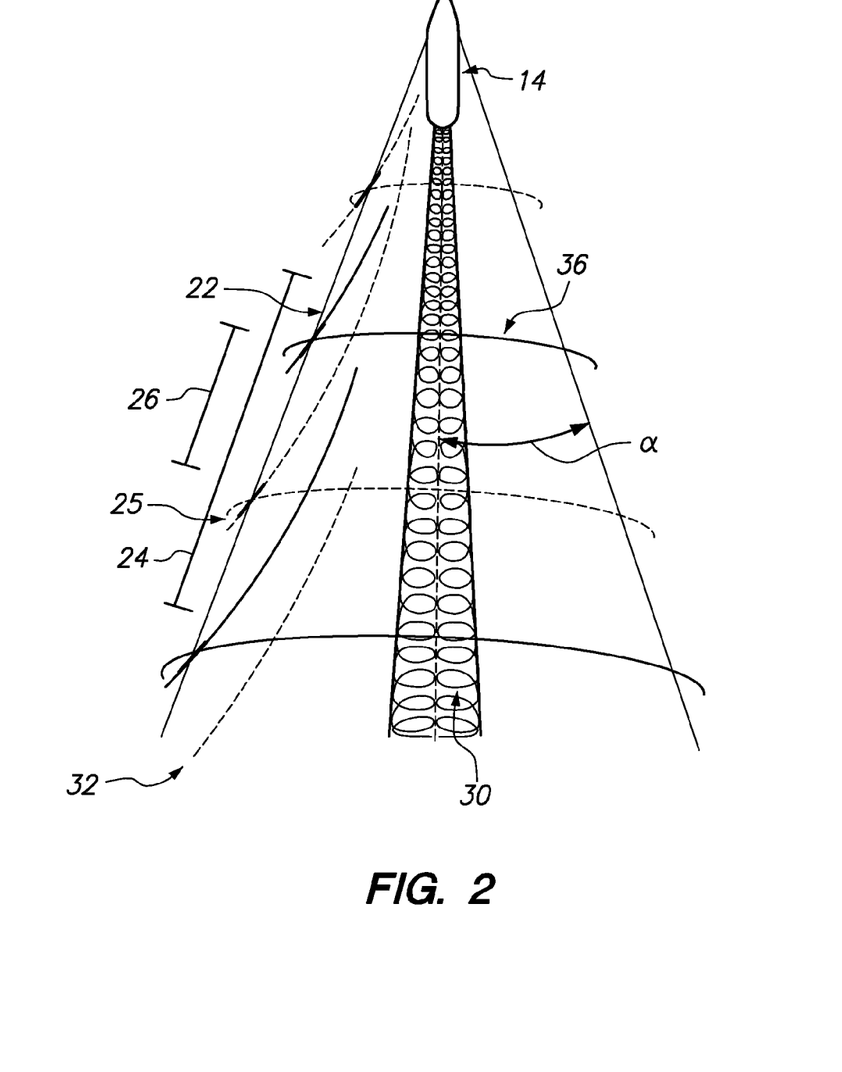
FIG. 2 is a lined drawing of a wake that depicts an image used by the system of FIG. 1, which illustrates the general characteristics of a generic wake in greater detail.
Figure 3:
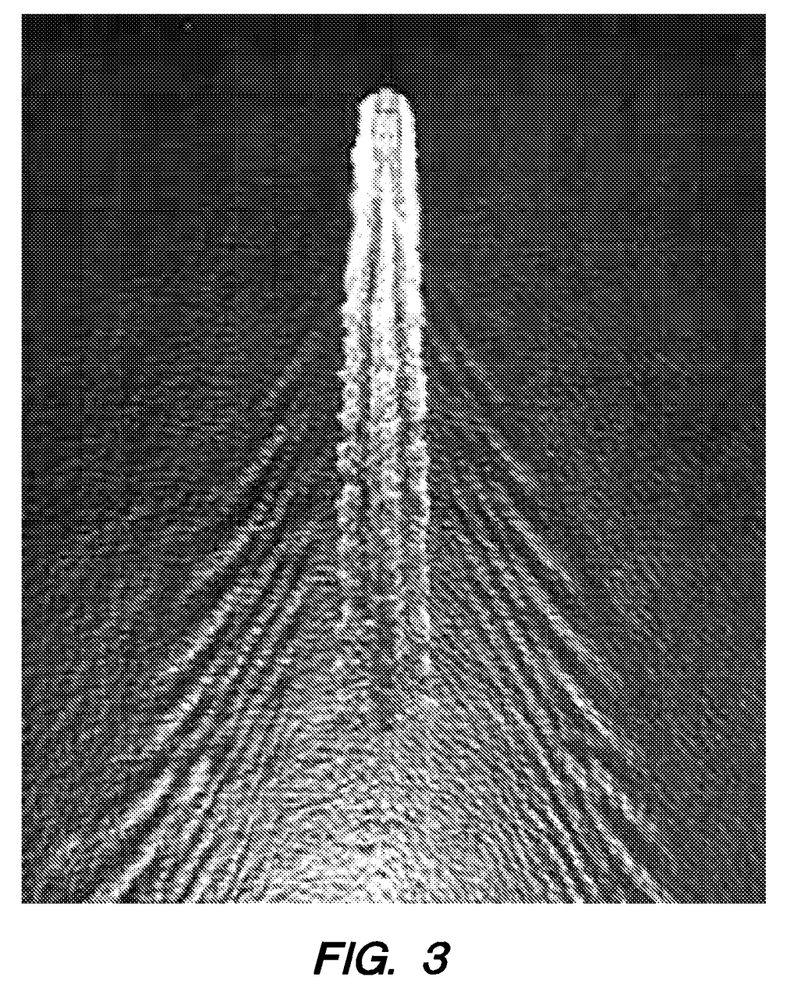
FIG. 3 is a black-and-white photograph of an actual wake image that can be processed by the system of FIG. 1.
Figure 4:
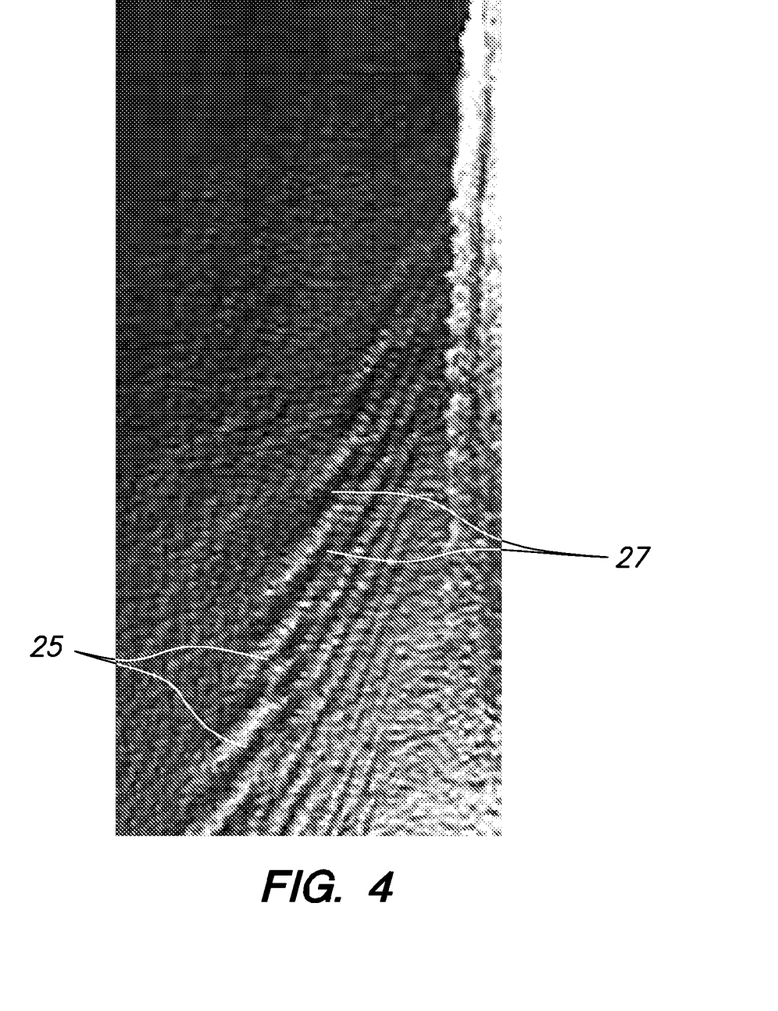
FIG. 4 is an enlarged view of a portion of the photograph of FIG. 3, which illustrates the pixel intensity maxima and minima along the wake cusp line.
Figure 5:
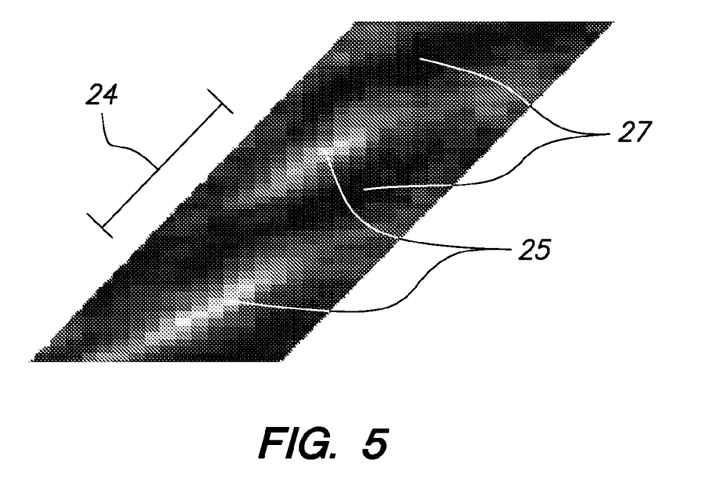
FIG. 5 is an enlarged view of the portion of the photograph of FIG. 4, which illustrates pixel maxima and minima at a more granular level, and which illustrates how a one-dimensional cross-section intensity profile of image 16 along the chosen segment 24, i.e. the one-dimensional cross-section of the two-dimensional image intensity can be used to build an intensity profile of the image wake, and to determine the image intensity maxima and mimima.

Once the user has located a wake 21 in the image 16 with suitable wake features, the systems and methods according to several embodiments can be initiated. Referring now to diagram 100 in FIG. 6, the user can take the initial step 102 of defining a suitable cusp line for the wake. The wake cusp line 22 (see FIGS. 2-4) is a line that forms when both the Kelvin wake and the distinct "turbulent wake", which generated by the disturbance of the vessel moving through sufficiently deep water, constructively interfere with each other. Typically, the cusp line is at an angle α of approximately 19.5° from the ship's line of motion, as shown in FIG. 2. As shown in FIG. 3, the two cusp lines 22a, 22b make the distinctive "V" shape.

Figure 6:
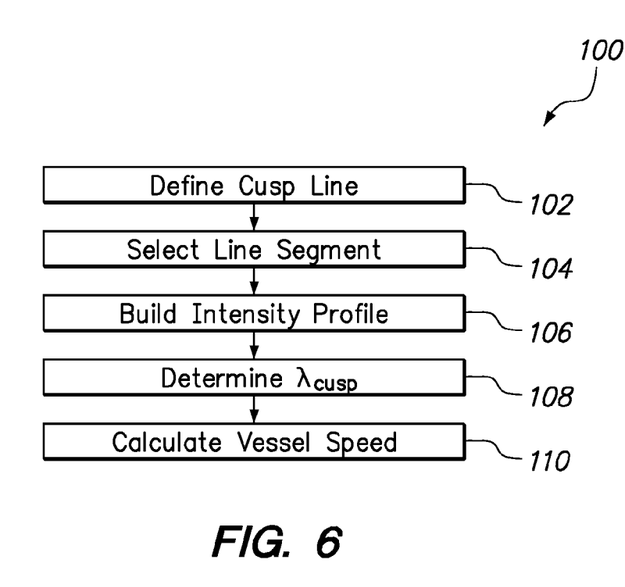
FIG. 6 is a simplified block diagram of a sequence that describes the methods according to several embodiments.

After the wake cusp line has been defined, the next step of the method according to several embodiments is to select a segment 24 of the cusp line 22 (FIG. 2), as shown by step 104 in FIG. 6. In order to infer the speed of a displacement hull vessel in the "deep water" limit, the cusp wavelength $\lambda_{cusp}$ of the vessel's Kelvin wave wake along a line segment 24 must be determined. For the present invention according to several embodiments, and as shown by reference character 26 in FIGS. 2 and 4, $\lambda_{cusp}$ is defined as the distance between successive brightness maxima or success brightness minima along segment 24 for image 16 (The pixel brightness maxima and minima are represented by 25 and 27, respectively, in the Figures). To determine $\lambda_{cusp}$ 26 along line segment 24 the invention according to several embodiment can calculate two quantities from the selected wave segment 24: (1) the length of the selected wave segment 24 and (2) the number of cusp wavelengths 26 within the selected wave segment. With these two quantities the cusp wavelength is obtained by $$\lambda = \lambda_{cusp} = \frac{\text{length of wave segment}}{\text{number of wavelengths in wave segment}} = \frac{\text{Quantity(1)}}{\text{Quantity(2)}}. \quad \text{(Equation 1)}$$

The following is a description of the methods by which Quantities (1) and (2) are determined The invention according to some embodiments can determine Quantity (1) by calculating the distance between the two endpoints of the wave segment. One of two distance formulas is automatically chosen by querying the units of the projection of image 16. If the units are degrees, then the length is calculated using (Equation 2a) below; if the units are meters, or some other unit of length, then the length is calculated using (Equation 2b) below.

In a geo-referenced image 16 (i.e. when units are in degrees), pixel positions are specified in angles of latitude and longitude. In this case, the latitude and longitude for the two endpoints are converted from units of degrees to radians. The invention calculates the distance between these two points using the following formula:

$$d = R\sqrt{(\Delta\theta)^2 + (\Delta\varphi\cos(\theta))^2} \quad \text{(Equation 2a)}$$

Here d is the distance between the two endpoints of the cusp line segment 24 in meters, R is the mean earth radius in meters (6371000 m), θ is the latitude in radians and Δθ and Δφ are, respectfully, the differences in latitude and longitude of the endpoints in radians. This formula is an approximation that assumes small values of Δθ and Δφ, or equivalently $$\frac{d}{R} \ll 1.$$

This assumption will be valid for any wakes a user would encounter in practice.

For a geo-rectified image 16, pixel locations are specified in distance, typically in units of meters. In this case, the invention uses the following straight-forward application of the Pythagorean Theorem to calculate the distance between the two endpoints of the line:

$$d\sqrt{(\Delta x(m_2 - m_1))^2 + (\Delta y(n_2 - n_1))^2} \quad \text{(Equation 2b)}$$

Here d is the distance in meters between the two endpoints of the cusp line segment 24, $\Delta x$ is the linear pixel size ("ground sample distance") in meters for the East-West direction, likewise $\Delta y$ is the linear pixel size for the North-South direction in meters (generally $\Delta x = \Delta y$), and $(m_1, n_1)$ and $(m_2, n_2)$ are the image pixel coordinates for the endpoints of the segment. Equation 2b is precise for geo-rectified images that are in the most common Universal Transverse Mercator (UTM) projection, and valid to the small-angle approximation for other projections.

Once the overall actual length of segment 24, Quantity (1), is calculated, the invention in several embodiments can then determine Quantity (2), the number of wavelengths 26 present in the selected segment 24. To achieve this, and as indicated by step 106 in FIG. 6, the invention according to several embodiments can build (can generate) an "intensity profile" of image 16 along the chosen segment 24, i.e. a one-dimensional cross-section of the two-dimensional image intensity (See FIG. 5) along the specific line segment 24. For suitable wakes, the dominant wavelength, i.e. $\lambda_{cusp}$, in the measured image intensity profile corresponds to the wavelength of the water surface along the same line. Therefore, to determine Quantity (2) the invention automatically build an intensity profile and then searches for the number of dominant wavelengths (number of successive brightness maxima or successive brightness minima) that are present in the intensity profile within segment 24. This can be accomplished using a spatial frequency domain transform procedure, which is detailed more fully below.

For this invention, the Power Spectral Density (PSD) essentially serves as a spatial frequency domain representation that can automatically yield the wavelength at peak power, i.e. the dominant wavelength (as well as the number of dominant wavelengths in the profile) via the calculations described here. First, the invention computes the Discrete Fourier Transform (DFT) of the mean-subtracted intensity profile, $$I'(n) = I(n) - \frac{1}{N}\sum_{n=0}^{N-1} I(n),$$

where n is the index of the $n^{th}$ sample in the N-point long profile. The DFT of I'(n) is the sequence of complex values given by:

$$DFT(k) = \sum_{n=0}^{N-1} I'(n)e^{-\frac{2\pi i n k}{N}} \quad \text{(Equation 3)}$$

where $i=\sqrt{-1}$, and the integer index k signifies spatial frequency in cycles per sample.

The PSD is proportional to the magnitude, or complex modulus, of the DFT and is thus a real-valued sequence given by:

$$PSD(k) = C|DFT(k)|^2 \quad \text{(Equation 4)}$$

where $$C = \frac{1}{N}.$$

(Only relative PSD values are required, so the choice of C is immaterial here).

Once the PSD is computed, the invention determines the value $k_{max}$, the integer spatial frequency index at which the PSD achieves its maximum value.

$$k_{max} = \text{argmax}(PSD(k)), \quad \text{(Equation 5)}$$

The dominant spatial frequency $k_D$ within the measured intensity profile for segment 24, in cycles per meter, is then given by:

$$k_D = \frac{k_{max}}{2N\Delta r} \quad \text{(Equation 6)}$$

where $\Delta r$ is the sample interval in meters along the line of the selected wake segment. Selected wake segments are generally at an arbitrary azimuth angle, so $\Delta r$ must in general be larger than the linear ground sample distance of the image, $\Delta x$. Specifically, for a profile with an azimuth angle of $\alpha$ in the image coordinates, $$\Delta r = \Delta x \sqrt{1 + \sin(\alpha)^2} \quad \text{(Equation 7)}$$

In turn, the dominant wavelength in units of meters within the image intensity profile is:

$$\lambda_{cusp} = \frac{1}{k_D} = \frac{2N\Delta r}{k_{max}} \quad \text{(Equation 8)}$$

The PSD-computed $\lambda_{cusp}$ from Equation 8 above can yield the vessel speed immediately upon substitution into Equation 9c. A theoretically equivalent vessel speed inference is achieved when the value of $\lambda_{cusp}$ is provided instead by Equation 1, using the profile length d=Quantity (1) from Equation 2 along with the cusp wave count $N_{cusp}$=Quantity (2), which may be obtained either automatically $$\left(\text{via Equation 8 followed by } N_{cusp} = \frac{d}{\lambda_{cusp}}\right),$$

or manually (via visual inspection of the IVS), as indicated by step 108 in FIG. 6.

Figure 7:
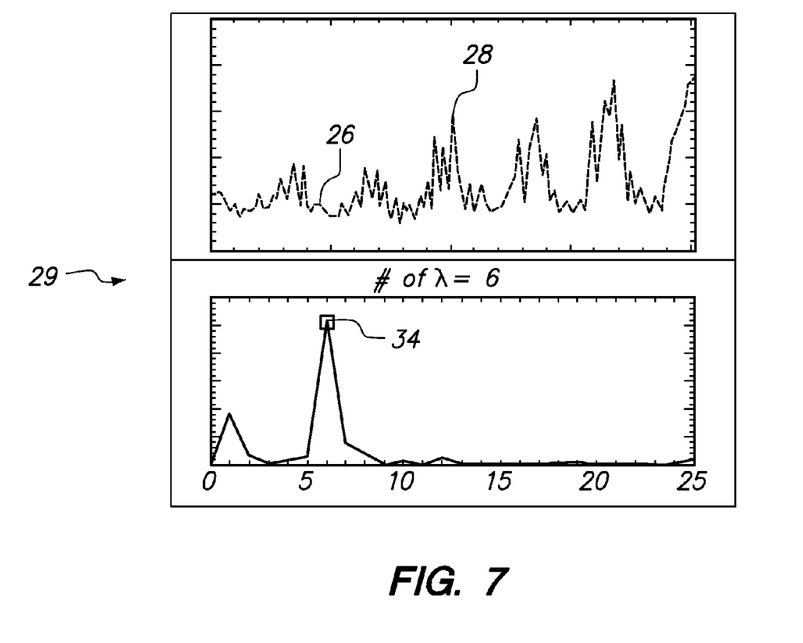
FIG. 7 is a graph that is depicts the results of the build intensity profile step of the diagram of FIG. 6, which represents the number of cusp wavelengths within the chosen wave segment; and, FIG. 8 is a table which illustrates the results an operational test of the systems and methods of the present invention according to several embodiments, and which lists the computed speeds of several vessels in comparison to the actual speed of the vessel that was imaged.

Referring now to FIG. 7, a graph 29 of the PSD function of the intensity profile along segment 24 can be shown. In FIG. 7, it can be seen from graph 29 of the PSD of the intensity profile that a number of peaks 28 correspond to the brightness maxima 25 of the image 16 along segment 24. Graph 29 displays the automatically determined number of wave maxima that were counted (in this case, 6). To cross-check the automatically calculated value of Quantity (2) as depicted by reference character 34 in graph 29, the user can visually inspect this plot and manually count the number of maxima or minima in the profile, which is often quite effective in practice with real EO images. Alternatively, the user may count the number of maxima 25 or minima 27 within the segment 24 simply by inspecting the image itself, together with the line segment 24.

Since the above values are derived from PSD estimates over an integer number of wavelengths, the typical "spectral leakage" problems encountered in spectral estimation are mitigated without resorting to data tapering. This is a distinct advantage, because in this way a line of relatively few wave periods, e.g. 7, can be automatically counted with a high degree of accuracy.

To calculate the speed of vessel 14 in image 16, and as indicated by step 110 in FIG. 6, the systems and methods according to several embodiments of the present invention utilize an analytical physical model that describes the small-amplitude wave wake generated by displacement hull vessels. The following formulas from this model are valid in the "deep water" or low Depth Froude Number approximation. The wavelength of a vessel's transverse wake 36 (See FIG. 2), $\lambda_{transverse}$, is directly proportional to the squared speed of the vessel and is given by the following formula:

$$\lambda_{transverse} = 2\pi \frac{v_{ship}^2}{g} \quad \text{(Equation 9a)}$$

where g is the acceleration of gravity.

The wavelength of a vessel's Kelvin wake cusp, $\lambda_{cusp}$, is proportional to X, $\lambda_{transverse}$ and is given by $$\lambda_{cusp} = \frac{2}{\sqrt{3}} \lambda_{transverse} \quad \text{(Equation 9b)}$$

Combining Equations (9a) and (9b) and solving for $v_{ship}$, the vessel speed $v_{ship}$ in meters per second, can then be expressed in terms of $\lambda_{cusp}$ as $$v_{ship} = \sqrt{1.352 * \lambda_{cusp}} \quad \text{(Equation 9c)}$$

In this way, the invention provides a rapid inference of the speed of the vessel, based on the measured dominant wavelength of the cusp wave. For the user's convenience the invention converts the speed value to units of knots, and the inferred speed value in both knots and meters per second is displayed and stored according to user settings. Finally, in several embodiments of the present invention, the user can repeat steps 104-110 and average the calculated speed over a number of selected wake segments 24. In this manner, a better estimate of vessel speed can be generated.

Figure 8:
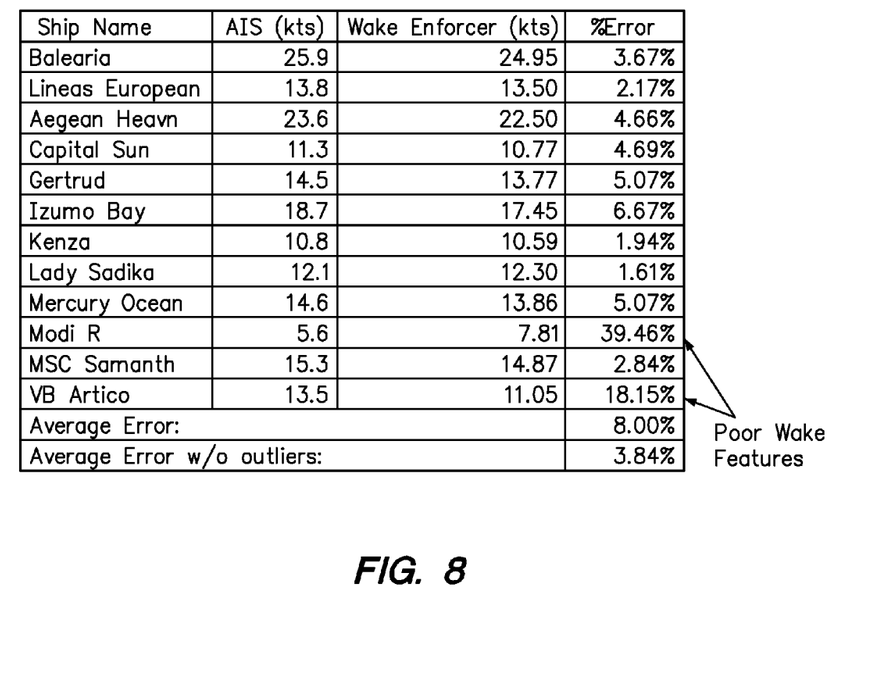

FIG. 8 is a table which shows the result of the operation of the invention according to several embodiments. FIG. 8 displays the calculated speed of several vessels within an image at a specific point in time, and further displays the actual speed of the vessel (or at least, the speed the vessel is self-reporting via the Automatic Identification System (AIS), which is a system used worldwide by vessels to exchange electronic data, including vessel speed, with other nearby ships and shore stations. The international maritime organization's (IMO) international convention for the safety of life at sea (SOLAS) requires AIS to be fitted aboard international voyaging ships with gross tonnage (GT) of 300 or more tons, and all passenger ships regardless of size. It is estimated that more than 40,000 ships currently carry AIS equipment.

The data represented in FIG. 8 demonstrates the accuracy of the system and methods according to several embodiments in that the calculations, and shows a four percent (4%) agreement, on average, with the ground truth reported by the listed vessels to AIS. Some of this error, albeit small, could be attributed to the fact that AIS ship speed are speeds relative to the ground, while the system and methods according to several embodiments calculate the speed relative to the water. Support for this reasoning comes from the fact that the calculated speeds are, on the whole, less than the AIS ground truths. Also, demonstrated in FIG. 8 is the consequence of not having well-defined wake features over which to select a wake cusp line.

From FIG. 8, it can be seen that the system and methods according to several embodiments can quickly and accurately generate vessel speed from a single image 16, which can then be used to further analysis of the image 16.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A method for determining the speed of a vessel from an overhead image of the wake of said vessel, comprising the steps of;
   A) defining a cusp line for said wake;
   B) selecting a representative line segment from said cusp line;
   C) building an image intensity profile for said image along said line segment;
   D) determining wavelength $\lambda_{cusp}$ using said image intensity profile; and,
   E) calculating said vessel speed according to the formula $$v_{ship} = \sqrt{1.352 * \lambda_{cusp}}.$$

2. The method of claim 1 where said step D) is accomplished using a geo-referenced said image.

3. The method of claim 2 where said step D) is accomplished using a geo-rectified said image.

4. The method of claim 1 wherein said step D) is accomplished by measuring the distance between successive intensity maxima from said intensity profile.

5. The method of claim 1 wherein said step D) is accomplished by measuring the distance between successive intensity minima from said intensity profile.

6. The method of claim 1 wherein said image is selected from the group consisting of synthetic aperture radar (SAR) images and electro-optical (EO) images.

7. A system for monitoring speeds of vessels in an area of responsibility (AOR) comprising:
   means for generating an overhead image, said image depicting at least one wake, each said wake corresponding to a said vessel;
   a processor in communication with said generating means, said processor including a non-transitory medium that, for each said wake, accomplishes the following steps;
   A) defining a cusp line for said wake;
   B) selecting a representative line segment from said cusp line;
   C) building an image intensity profile for said image along said line segment;
   D) determining wavelength $\lambda_{cusp}$ using said image intensity profile; and,
   E) calculating said vessel speed according to the formula $$v_{ship} = \sqrt{1.352 * \lambda_{cusp}}.$$

8. The system of claim 7, wherein said processor accomplishes said step D) using a geo-referenced said image.

9. The system of claim 7, wherein said processor accomplishes said step D) using a geo-rectified said image.

10. The system of claim 7 wherein said processor accomplishes said step D) by measuring the distance between successive intensity maxima from said intensity profile.

11. The system of claim 7 wherein said processor accomplishes said step D) by measuring the distance between successive intensity minima from said intensity profile.

12. The system of claim 7 wherein said generating means is selected from the group consisting of synthetic aperture radar (SAR) satellites and electro-optical (EO) satellites.

13. The system of claim 7 wherein said generating means is a satellite.

14. The system of claim 7 wherein said generating means is an aircraft.

* * * * *